United States Patent [19]

Hladik, Jr.

[11] Patent Number: 4,995,228

[45] Date of Patent: Feb. 26, 1991

[54] CUTTING BLADE FOR ROTARY CUTTING MACHINERY

[76] Inventor: Joseph C. Hladik, Jr., R.R. #1, P.O. Box 145A, Hennessey, Okla. 73742

[21] Appl. No.: 516,973

[22] Filed: Apr. 30, 1990

[51] Int. Cl.$^5$ ............................................. A01D 34/73
[52] U.S. Cl. ........................................ 56/255; 56/295; 56/DIG. 17
[58] Field of Search ................ 56/17.5, 255, 295, 229, 56/DIG. 17, DIG. 20; 30/347, 351

[56] References Cited

U.S. PATENT DOCUMENTS

| | | |
|---|---|---|
| 1,407,417 | 2/1922 | Huelves . |
| 2,850,862 | 9/1958 | Asbury ............................. 56/295 |
| 3,022,621 | 2/1962 | Zavarella .......................... 56/295 |
| 3,087,298 | 4/1963 | Phillips, Sr. ...................... 56/295 |
| 3,214,896 | 11/1965 | Watkins et al. .................. 56/295 |
| 3,447,291 | 6/1969 | Guetterman ..................... 56/295 |
| 4,254,607 | 3/1981 | Moore .............................. 56/295 |
| 4,628,672 | 12/1986 | Jones ................................ 56/295 |
| 4,765,123 | 8/1988 | Hamblen .......................... 56/255 |
| 4,771,593 | 9/1988 | Lee ................................... 56/295 |
| 4,936,884 | 6/1990 | Campbell ......................... 30/347 |

FOREIGN PATENT DOCUMENTS 0300642 1/1989 European Pat. Off. ............. 56/295

Primary Examiner—Ramon S. Britts
Assistant Examiner—Terry Lee Melius
Attorney, Agent, or Firm—Laney, Dougherty, Hessin & Beavers

[57] ABSTRACT

A rectangular metallic plate cutting blade having an opening at the center thereof for attaching the plate to a rotary power shaft. A pair of trapezoidally-shaped cutting recesses are cut into the leading edges of the blade. The edges of the plate defining the cutting recesses are beveled to provide sharp cutting edges. A turbulence flange extends upwardly from the trailing edge of the metallic plate on the opposite side of the plate from each of the trapezoidally-shaped cutting recesses. Each of these turbulence flanges is from about 1.0 to about 1.5 times as long as the width of the trapezoidally-shaped recess with which it is aligned across the blade, and defines an angle of from about 35° to about 55° with respect to the major plane of the rectangular plate.

4 Claims, 1 Drawing Sheet

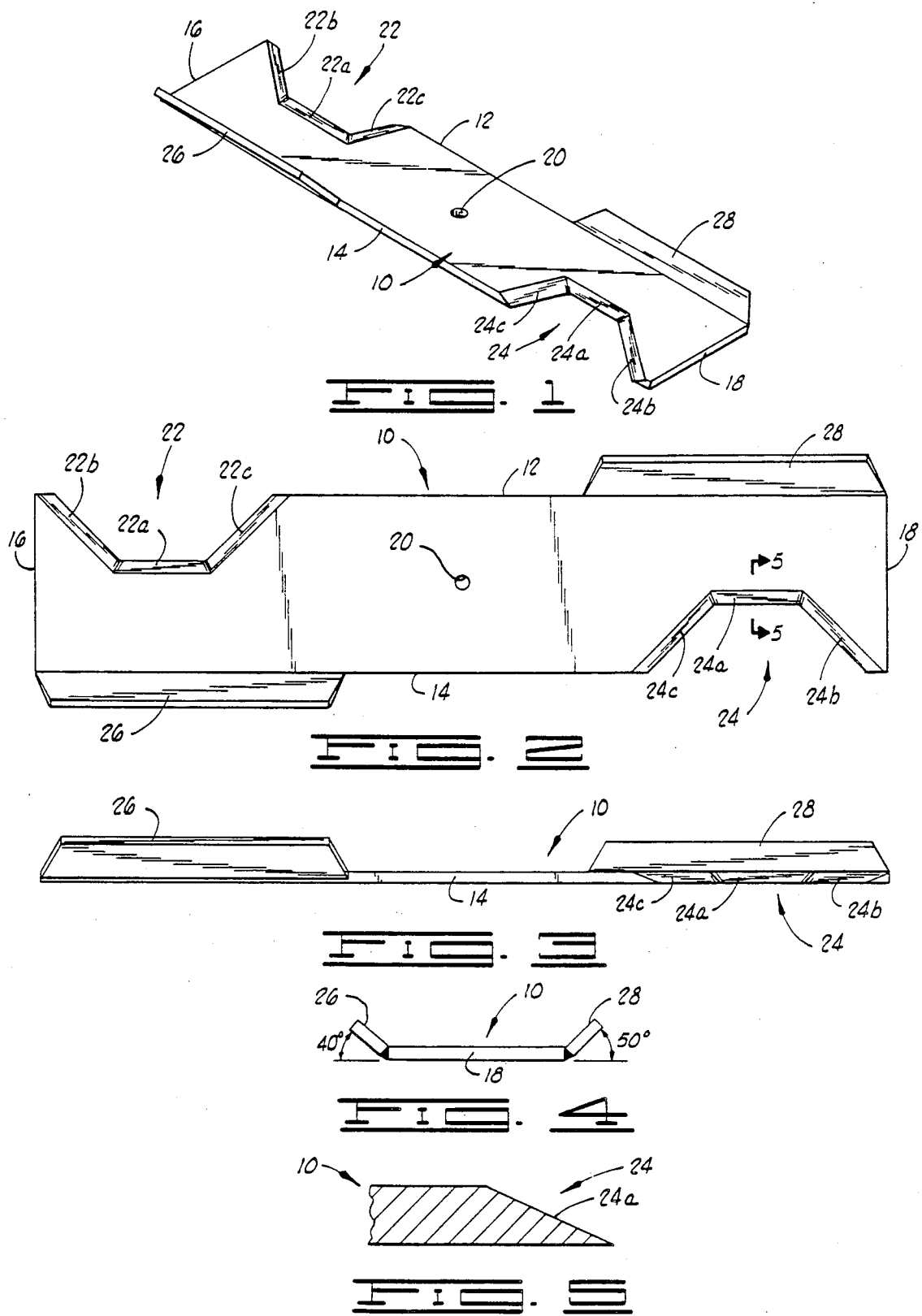

CUTTING BLADE FOR ROTARY CUTTING MACHINERY

FIELD OF THE INVENTION

This invention relates to blades for cutting vegetation, and more particularly, to rotary blades adapted to be powered by typical two-cycle lawn mower engines.

BACKGROUND OF THE INVENTION

BRIEF DESCRIPTION OF THE PRIOR ART

In Gutterman U.S. Pat. No. 3,447,291, a detachable mower cutter blade is disclosed which carries a cutting plate mounted within a socket at the leading side of a rectangular plate. The operational portion of the blade is curved forwardly so as to have a concavity which, according to the patentee, enhances the cutting action of the blade by directing the grass or grain to be cut. The cutting blade of this arrangement can be quickly and easily installed by the operator of the machine without resort to the services of skilled repair personnel.

In U.S. Pat. No. 4,771,593, a flat rectangular rotary cutting blade is disclosed and, as illustrated in FIG. 7 of that patent, such a blade may carry a pair of upturned flanges which extend at an angle upwardy from the principal plane of the blade plate, and are located near opposite ends of the blade. The flanges at opposite ends of the blade are located directly behind straight cutting edges carried on the leading, opposite sides of the blade.

In U.S. Pat. No. 4,628,672, a rotary cutting blade is disclosed in which the cutting edges formed at the leading sides of the blade adjacent the opposite ends of the blade are formed in a convex configuration. This causes them to slice through the vegetation to be cut, rather than severing the vegetation with a direct shearing action. Moreover, the sharpened cutting edges of the blades at the opposite ends thereof, extend from the leading edge to the trailing edge of the blade. These convex shearing edges can also be combined with a portion of the blade sharpened along the leading edge at opposite sides thereof, and constituting conventional contact-type cutting edges. There are upturned wind flanges provided at opposite ends of the blade and located approximately directly behind the straight conventional impact cutting edges provided at the leading edges of the blade. The inclusion of the wind flanges, or fan flanges, at the trailing edges of the blade is intended to create a fanning action for lifting the cut grass and blowing such grass through an outlet in the rotary cutting blade housing.

In FIG. 7 of Jones U.S. Pat. No. 4,628,672, an upturned flange is shown as located at the rear side of the blade with this flange trailing directly behind a sharpened cutting edge. Near the outer end of the blade, the cutting edges have an indentation or concavity formed in them. Upturned portions are referred to by the patentee as "fan" or "wind" portions.

In Watson et al U.S. Pat. No. 3,214,896, a rotary cutter blade is disclosed which has concave recesses or indentations formed along the leading edge of the blade, with these being sharpened for cutting the grass or other vegetation. At the trailing edge of the blade, angular wings or flanges are turned upwardly to provide "an upward fanning action" as the blade is rotated.

Another cutting blade which has cutting edges forming concave recesses is disclosed in U.S. Pat. No. 3,022,621. It will be noted that in this patent there are also outturned flanges which function to direct grass away from the blade.

In U.S. Pat. No. 1,407,417, the patentee provides a concave sharpened cutting surface along the forward or leading side of the blade.

A similar concave cutting surface is shown in Ashbury U.S Pat. No. 2,850,862. Here the patentee states that this sharpened concavity is provided so as to achieve a "sickle cutting action".

In Phillips U.S. Pat. No. 3,087,298, the blade provided has a hook-shaped portion at each of its ends, so that the overall configuration of the blade is somewhat of an S shaped configuration The cutting edges which are provided at the convex outer side edges of each of the end portions of the blade are rounded or arcuate in configuration, and terminate at outstanding baffle plates which are also convex in terms of direction of the blade travel. These baffle plates are said to function to push aside solid obstacles in the path of the blade as well as to create a centrifugal cyclonic action directing the severed grass toward the outlet in the mower housing.

In most but not all of the blade designs employed in the prior art, the wind vanes or upturned flanges are generally triangular in configuration, and extend at an angle to the longitudinal axis of the blade.

BRIEF DESCRIPTION OF THE PRESENT INVENTION

The present invention provides a rotary cutting blade which comprises a generally rectangular metallic plate (although it may vary slightly from a rectangular configuration), which includes a pair of opposed, substantially parallel longitudinal side edges and a pair of parallel end edges. Adjacent one end of each of the parallel side edges, a pair of trapezoidally-shaped concavities or recesses is formed in the flat blade plate. These concavities have the edges defining the trapezoidal configuration of each concavity or recess sharpened to a cutting edge. At the trailing edge of the blade plate opposite each of the trapezoidally-shaped recesses, a wind vane or turbulence flange is provided. Each of the turbulence flanges is a generally trapezoidally-shaped rectangular plate which projects upwardly from the major plane of the flat rectangular plate, and is aligned transversely across the blade from the trapezoidally-shaped recess or concavity in the forward or leading edge of the blade.

The configuration of each of the trapezoidally-shaped recesses greatly enhances the cutting action of the blade, and the geometric arrangement of the recesses in relation to the turbulence flanges assures that no excessive buildup of grass will occur tending to impede or impair the cutting action occurring at the trapeziodially-shaped recesses.

An important object of the invention is to provide an improved rotary cutting blade for use on cutting machinery, such as lawn mowers or the like, with the improved cutting action being achieved through the development of a gathering and slicing action. The several cutting edges are individually straight, and are thus more easily sharpened, but these edges collectively function to provide both shearing and slicing action of vegetation in the path of the edges of the rotating blade.

Another object of the invention is to provide an improved rotary cutting blade in which turbulence flanges are provided at opposite sides of the blade near the outer ends thereof. The turbulence flanges create air turbulence adequate to propel cut vegetation out of the housing which houses the rotary blade, thus preventing buildup of vegetation adjacent the cutting edges impairing the cutting efficiency of the blade.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

FIG. 1 is a perspective view of the cutting blade of the invention.

FIG. 2 is a top plan view of the cutting blade of the invention.

FIG. 3 is a side elevation view of the cutting blade of the invention.

FIG. 4 is an end view of the cutting blade of the invention.

FIG. 5 is a sectional view taken along line 5—5 of FIG. 2.

DETAILED DESCRIPTION OF A PREFERRED EMBODIMENT OF THE INVENTION

The cutting blade of the invention is an elongated, generally rectangular metallic plate which has been bent and cut at certain places to provide the unique characteristics and improved efficiency which characterizes the blade. The rectangular plate is designated generally by reference numeral 10 and includes a pair of parallel, longitudinal side edges 12 and 14, and a pair of substantially parallel end edges 16 and 18. The plate 10 preferably has a thickness of about one-quarter inch, and is of whatever length may be required to fit the lawn mower for which it is used. The plate 10 has a transverse width of at east two and preferably four inches. At substantially the center of the rectangular metallic plate, a hole 20 (or other means) is provided by which the blade can be mounted in a symetrical balanced fashion on a high speed rotating power shaft.

As the blade has been depicted in the drawings, and particularly FIGS. 1 and 2, it is shown as it is mounted on a shaft for clockwise rotation. Thus, as the blade rotates about the axis of a centrally located power shaft, the upper left portion of the blade (as shown in FIG. 1) is first to contact the grass, and the lower right portion of the blade becomes the trailing edge passing through the grass after the opposite side edge 14 of the blade has traversed the grass. A pair of trapezoidally-shaped recesses are formed in the opposed cutting edges of the blade and are designated generally by reference numerals 22 and 24. The trapezoidally-shaped recesses 22 and 24 are substantially identical in configuration and construction, and each includes an open mouth located at the side edge of the blade into which the recess is cut. The open mouth of each of the recesses 22 and 24 is preferably about four inches in length.

Each trapezoidally-shaped slot or recess 22 and 24 is defined by a trapezoidally-shaped beveled cutting edge, with one internal part of each of the cutting edges extending parallel to the elongated side edge 12 or 14 into which the recess is cut. This parallel internal cutting edge is, in the case of the recess 22, denominated by reference numeral 22a, a, and in like manner, the trapezoidally-shaped recess 24 has an internal cutting edge 24a. Each of the internal cutting edges 22a and 24a of the trapezoidally-shaped recesses 22 and 24 intersects a pair of convergent grass gathering edges forming the other two sides of the trapezoidally-shaped notch or recess. Thus, the trapezoidally-shaped recess 22 includes the side edges 22b and 22c. These grass gathering cutting edges extend at an angle of about 45° to the internal cutting edge 22a. In like fashion, the trapezoidally-shaped recess 24 includes a pair of convergent grass gathering cutting edges 24b and 24c. The convergent cutting edges 24b and 24c extend at an angle of about 45° to the internal cutting edge 24a.

The described geometry of the notches or recesses formed in the metallic plate 10 result, in a preferred embodiment of the invention, in the open forward side of each trapezoidally-shaped recess being about four inches in width, with the internal cutting edge which is parallel to the leading edge opening being about two inches in width and spaced therefrom along a line extending perpendicular to each by a distance of about two inches. It should be further pointed out that the outermost end of each recess or concavity begins between about one-fourth inch and one-half inch from the end of the blade, and preferably begins about one half inch from such end. The cutting edges which extend around the periphery of each trapezoidally-shaped recess 22 and 24 formed in opposite ends of the metallic plate, as shown, are beveled or tapered at an angle of between about 20° and 30° with respect to the upper or lower surface of the blade. This relationship is best illustrated in FIG. 5 of the drawings.

At the following or trailing side edge of the blade directly opposite, or in line with, the respective trapezoidal recess 22 or 24, a generally rectangular turbulence flange is secured to the respective elongated longitudinal edge 12 and 14 of the metallic plate 10. Each of these turbulence flanges projects upwardly at an angle with respect to the major plane of the metallic plate. Thus, a turbulence flange 26 is provided in alignment with the recess 22 and is located on the opposite side of the plate 10 therefrom. Similarly, a turbulence flange 28 is disposed on the opposite side of the plate 10 from the recess 24. The turbulence flanges 26 and 28 are, in each case, made to extend to the respective adjacent end edge 16 or 18 of the plate 10. Each of the turbulence flanges 26 and 28, like the rectangular plate 10, has a thickness of about one-fourth inch.

Each of the two turbulence flanges 26 and 28 extends upwardly at an acute angle to the major plane of the plate 10. These angles are slightly different from each other, however, for a purpose hereinafter described. Thus, one of the turbulence flanges 26 or 28 extends upwardly at an angle which is preferably about 40° with respect to the major plane of the plate 10, whereas the other of the turbulence flanges preferably extends upwardly at a slightly steeper angle of about 50° with respect to the plane of the rectangular plate. In general, the difference in this angulation of the turbulence flanges is preferably from about 6° to about 14°, with about 10° of difference having been found to be preferred. This difference in angulation results in imparting a pulsating action to the blade during its rotation as hereinafter described. Each of the turbulence flanges 26 and 28 has a width which is about one inch, and a length which is from about 1.25 to about 1.50 as great as the total width of the opening at the mouth of each of the trapezoidal recesses 22 and 24. In other words, the turbulence flange aligned with each of the recesses extends over a substantially greater distance of the length of the rectangular plate 10 than does the aligned recess at its widest point.

As previously explained, the blade rotates in a clockwise direction as viewed from the top of the lawn mower or other grass cutting machine to which it is mounted, and as viewed in FIG. 1 and 2 of the drawings.

In relation to the length of the cutting blade, the width of the blade of the present invention is considerably greater than most rotary cutting blades now available, and is an important factor in the effectiveness and trouble free service life of the blade. When vegetation is severed by the cutting edges of a conventional rotary cutting blade of this general type of conventional construction, much of the vegetation which is severed slides rearwardly across the top surface of the blade until it is deflected off of the blade by the following flange, or is lifted upwardly and outwardly by the air flow within the blade housing. If the distance between the cutting edges and any deflector flange which is provided is small, the cut vegetation tends to build up or accumulate near the cutting edges as it stacks in front of the deflector flange, and this inhibits additional effective and efficient cutting. This is particularly true when there is any dampness or moisture in the vegetation being cut.

In the present invention, by making the width of the top surface of the blade adequate to allow for ample slide-off of the cut vegetation before a buildup occurs, the cutting efficiency is enhanced and the likelihood of clogging impairing the cutting efficiency of the sharpened leading edges is reduced In the case of the present invention, the width of the rectangular plate is such that a minimum slide surface width across the blade of two inches will be maintained, even after many re-grindings of the cutting edges have been carried out.

Since the blade of the present invention is both relatively wider and is, in general, made of thicker steel than most cutter blades which have been previously provided, the blade of this invention is also considerably heavier, and this contributes to a significant fly wheel effect This results in a smoother and more efficient cutting operation, with less stress on the prime mover used to drive the blade in rotation. This enhancement of the inertia of the heavier blade also enables it to more effectively cut through matted, wet or overly long and dense vegetation, so that the rotation, even at these times, continues uninhibited, and the stalling torque transmitted to the engine is not significant.

The trapezoidal concavities or recesses 22 and 24 which define the cutting edges of the blade provide straight, easily re-ground edges. The trapezoidal configuration of each recess yields a twenty percent greater overall length of cutting edge than the length of a straight cutting edge formed along the leading edge of a conventional blade, and equal in length to the opening of the trapezoidally-shaped recesses of the present invention. Over half of the total cutting edge length in each concavity or recess is in the inclined grass gathering cutting edges, 22b and 22c in the case of the concavity 22, and 24b and 24c in the case of the concavity 24.

These inclined cutting edges, as has been previously explained, extend at an angle of about 45° to the parallel elongated side edges 12 and 14 of the blade. Thus, the angle of attack at which these cutting edges strike the vegetation to be cut is also at a slanting angle of about 45° in contrast to a straight or normal shearing attack on the stem of the vegetation to be cut. The vegetation which is to be cut is therefore forced to slide along the diagonal cutting edges, and to be subjected to a slicing action. This slicing action cuts the vegetation with greater efficiency than the chopping action which occurs when vegetation is contacted by a cutting edge moving normal to the stem of the vegetation, instead of across the stem in the described slicing action.

The portion of each of the trapezoidally-shaped recesses 22 and 24 which is parallel to the leading edge of the blade is also important. It prevents the clogging which occurs when the angle sides o the concavity are not spaced sufficiently far from each other, as in the extreme case of a triangular notch formed in the blade. It also aids in maintaining the desired grass slide width between this particular cutting edge and the back side of the blade where the turbulence flanges are located, so as to prevent buildup of the vegetation as hereinbefore described. Finally, as previously pointed out, the trapezoidal shape entails straight cutting edges that are relatively easy to sharpen, as contrasted with an arcuate or curved cutting surface which some prior art blades have employed.

The outermost inclined edge of each of the trapezoidally-shaped concavities (that is, the diagonal sharpened edge which is closest to an end edge 16 or 18 of the rectangular plate 10) forms a hook-like or sickle-type cutting implement as it moves in a rotary path through the grass, thereby substantially enhancing the cutting efficiency by gathering and lifting the vegetation to be cut into the concavity and across the most effective diagonal cutting edges.

Although the length of the rectangular plate may vary, the dimensions, angles and geometric relationships of the cutting edges of the recesses 22 and 24 are important to the achievement of optimum cutting efficiency with the blade of the invention, and are preferably substantially maintained, regardless of the variations which may be required in overall blade lengths on various types of lawn mowers The turbulence flanges of the invention function to direct material which has been cut away from the cutting edges, and out of the blade housing or cowl. Although a lift flange or an irregular top blade surface, or a following edge wing, or a raised wind vane is characteristic of many types of rotary cutting blades now marketed, the turbulence flanges of this invention are unique in their size and location, and in their relation to the cutting edges located at the trapezoidally-shaped recesses indented in the leading sides of the blade plate. The preferred dimensions of the turbulence flanges of about one inch in width, and about six inches in length provide an adequate deflection surface both to physically deflect in an upward and outward direction, the cut materials sliding rearwardly across the blade from the cutting edges, and also to create an upward, outward spiralling air movement above the blade and within the blade housing. The velocity of this air movement is sufficient to lift the cut material and to eject it from the blade housing at a sufficient velocity to avoid clogging and impeding the free rotation of the blade. As this upward and outward air flow is established above the blade, a substantial lifting vacuum results below the blade which tends to suck the vegetation upwardly, or extend it vertically, though it is bent over before encountering the high speed rotating blade of the invention, and following such "standing up action", the vegetation can be cleanly cut through by the cutting edges.

As has been pointed out, the turbulence flanges of the rotary cutting blade of the invention are inclined upwardly to the horizontal plane of the rectangular blade plate at different angles which preferably differ from each other by about 10°. These varying flange angles result in a pulsing or surging turbulence of the air flow and vacuum created within the blade housing. This irregularity or pulsing in the air movement is more effective than a steady air flow in clearing cogs and lifting matted vegetation, and generally setting in motion a clearing action so important to effective cutting of the vegetation as the lawn mower is advanced.

Although a preferred embodiment of the present invention has been herein described, some departures from the described geometry and dimensions of the blade which have been described can be effectively utilized without significant loss of efficiency, or reduction in the highly optimized cutting action of the blade. Changes of this type which nevertheless continue to rely upon the basic principles of the invention are deemed to be circumscribed by the spirit and scope of the invention, except as the same may be necessarily limited by the appended claims, or reasonable equivalents thereof.

What is claimed is:

1. A rotary cutting blade comprising:
   an elongated metallic plate having a pair of opposed, parallel longitudinal side edges defining between them the width of the blade, and having a pair of opposite ends.,
   means at substantially the center of the plate for mounting the plate on a rotating power shaft;
   a first trapezoidally-shaped cutting recess opening into the plate from one of said longitudinal side edges at a location adjacent one of the ends of the plate, said first cutting recess having an internal sharpened cutting edge extending parallel to said one longitudinal side edge, and having a pair of diagonal cutting edges extending from said internal cutting edge to said one longitudinal cutting edge, each of said diagonal cutting edges extending at an angle of from about 40° to about 50° to said internal cutting edge;
   a second trapezoidally-shaped cutting recess opening into the plate from the other of said longitudinal side edges at a location adjacent the other end of the plate which is opposite the end nearest said first cutting recess, said second cutting recess having an internal sharpened cutting edge extending parallel to said longitudinal side edges, and having a second pair of diagonal cutting edges extending from the internal cutting edge of said second recess to said other longitudinal cutting edges, each of said diagonal cutting edges extending at an angle of from about 40° to about 50° to the internal cutting edge of said second recess;
   a first turbulence flange secured to said one longitudinal edge at a location directly across said plate from said second cutting recess and extending upwardly from said plate at an angle of from about 40° to about 50°; and
   a second turbulence flange secured to said other longitudinal edge at a location directly across said plate from said first cutting recess and extending upwardly from said plate at an angle of from about 40° to about 50°.

2. A rotary cutting blade as defined in claim 1 wherein said first turbulence flange extends upwardly at an angle with respect to said plate which differs from the angle at which said second turbulence flange extends upwardly from said plate by about 10°.

3. A rotary cutting blade as defined in claim 1 wherein the distance between the internal sharpened cutting edges of said trapezoidally-shaped cutting recesses and the nearest adjacent turbulence flange located directly across said plate from the respective cutting recess is at least two inches.

4. A rotary cutting blade as defined in claim 1 wherein each of said turbulence flanges has a length as measured along the longitudinal edge of said plate from which said respective turbulence flange extends which is from about 1.25 to 1.5 times as long as the opening of the trapezoidally-shaped cutting recess which is aligned across the blade plate with the respective turbulence flange.

* * * * *